United States Patent
Neumann

(10) Patent No.: US 10,322,626 B2
(45) Date of Patent: Jun. 18, 2019

(54) ROAD CONSTRUCTION MACHINE OF THE ROAD PAVER OR FEEDER TYPE

(71) Applicant: BOMAG GMBH, Boppard (DE)

(72) Inventor: Tobias Neumann, Remagen (DE)

(73) Assignee: BOMAG GMBH, Boppard (DE)

( * ) Notice: Subject to any disclaimer, the term of this patent is extended or adjusted under 35 U.S.C. 154(b) by 62 days.

(21) Appl. No.: 15/606,320

(22) Filed: May 26, 2017

(65) Prior Publication Data

US 2017/0341498 A1    Nov. 30, 2017

(30) Foreign Application Priority Data

May 27, 2016  (DE) ......................... 10 2016 006 530

(51) Int. Cl.
| | | |
|---|---|---|
| *E01C 19/29* | (2006.01) | |
| *E01C 19/40* | (2006.01) | |
| *B60J 11/10* | (2006.01) | |
| *E01C 23/14* | (2006.01) | |
| *E01C 19/48* | (2006.01) | |
| *B60J 11/06* | (2006.01) | |
| *E01C 19/20* | (2006.01) | |

(52) U.S. Cl.
CPC ............... *B60J 11/10* (2013.01); *E01C 19/29* (2013.01); *E01C 19/405* (2013.01); *E01C 19/48* (2013.01); *E01C 23/14* (2013.01); *B60J 11/06* (2013.01); *E01C 19/40* (2013.01); *E01C 2019/207* (2013.01); *E01C 2301/04* (2013.01)

(58) Field of Classification Search
CPC ........ E01C 19/29; E01C 19/405; E01C 19/48; E01C 19/40; E01C 23/14; E01C 2019/207
See application file for complete search history.

(56) References Cited

U.S. PATENT DOCUMENTS

| | | | | |
|---|---|---|---|---|
| 4,429,921 | A * | 2/1984 | Fritz | ......................... B61D 7/20 |
| | | | | 105/282.2 |
| 6,202,922 | B1 * | 3/2001 | Phillips | ................... B65F 1/062 |
| | | | | 220/908 |
| 8,936,145 | B2 | 1/2015 | Buschmann et al. | |
| 9,580,875 | B1 * | 2/2017 | D'Ascanio | ............. E01C 19/48 |
| 2013/0051914 | A1 | 2/2013 | Buschmann et al. | |
| 2013/0183092 | A1 * | 7/2013 | Van Beek | ............... E01C 19/48 |
| | | | | 404/72 |

(Continued)

FOREIGN PATENT DOCUMENTS

| | | |
|---|---|---|
| DE | 29612034 | 10/1996 |
| EP | 2377995 | 4/2014 |

(Continued)

*Primary Examiner* — Abigail A Risic
(74) *Attorney, Agent, or Firm* — Grossman, Tucker, Perreault & Pfleger, PLLC

(57) ABSTRACT

A road paver or a feeder having a chassis driven by a drive unit, and a material hopper arranged in the working direction at the front of the road paver or the feeder, the material hopper having a hopper side wall extending in the working direction and a discharge flap tiltable about a pivot axis extending transversely to the working direction, the discharge flap comprising a flap base and a flap side wall which extends next to the hopper side wall and is fixed to the flap base and supported to be moveable relative to the hopper side wall, a protective cover, which at least partially engages around the edge of the flap side wall, being arranged on the hopper side wall.

14 Claims, 3 Drawing Sheets

(56) References Cited

U.S. PATENT DOCUMENTS

| | | | | |
|---|---|---|---|---|
| 2014/0037375 A1* | 2/2014 | Frelich | ............... | E01C 19/48 |
| | | | | 404/72 |
| 2015/0132058 A1* | 5/2015 | Anderson | ............ | E01C 19/48 |
| | | | | 404/84.05 |
| 2015/0321825 A1* | 11/2015 | Schwanitz | .......... | B65D 83/00 |
| | | | | 221/152 |
| 2016/0040368 A1* | 2/2016 | Frelich | ............... | E01C 19/48 |
| | | | | 404/110 |
| 2016/0060823 A1* | 3/2016 | Erdtmann | ............ | E01C 19/48 |
| | | | | 404/110 |
| 2016/0326702 A1 | 11/2016 | Fickeisen et al. | | |

FOREIGN PATENT DOCUMENTS

| | | |
|---|---|---|
| EP | 2377994 | 1/2016 |
| EP | 3091125 | 11/2016 |

* cited by examiner

ROAD CONSTRUCTION MACHINE OF THE ROAD PAVER OR FEEDER TYPE

FIELD

The invention relates to a road construction machine of the road paver or feeder type.

BACKGROUND

In road construction, for example, generic road pavers or feeders, hereinafter summarized as road construction machines, are used for laying base layers, for example concrete or asphalt layers. If the paving material is laid using a road paver, the feeder serves as an intermediate storage and for the transfer of paving material in the paving process. During the paving process, the road paver is supplied with paving material either directly by a transport vehicle, for example a truck, or via a feeder. When a feeder is involved, this feeder is supplied with paving material from a transport vehicle, and transfers said material to the road paver via a suitable conveyor device, typically a conveyor belt. Typically, these road construction machines are self-propelled. Both the road paver and the feeder comprise a machine frame and a chassis, for example comprising crawler tracks or wheels, which is driven by a drive unit, which may be a diesel combustion engine in most cases. A material hopper is provided at the front in the working direction of the road construction machine. The working direction of the road construction machine refers to the direction in which the road construction machine travels during working or paving operation. The material hopper is a storage space for paving material, the size of which can be increased and/or decreased by displacing and/or tilting the walls of the material hopper. The paving material is conveyed by the road construction machine from the material hopper via a conveyor device, for example a scraper belt, to the rear, where, in the case of a feeder, a conveyor is arranged, which transfers the paving material from the feeder to the road paver. In the case of a road paver, the machine comprises at its rear a transverse conveyor device, for example a screw conveyor, and a screed, via which the paving material is distributed, smoothened and pre-compacted across the entire paving width. A smooth, pre-compacted layer of the paving material is left behind the road paver, which can be further compacted by means of rollers, for example, in order to achieve a finished road.

The transfer of the paving material from the transport vehicle, in particular a truck, to the generic road construction machine, whether feeder or road paver, is in each case done in the same way. A truck loaded with the paving material backs until being directly in front of the road construction machine traveling in the working direction, and stops there. Now, a controlled collision between the two vehicles is effected. To that end, collision rolls may be provided on the end of the construction machine located in the front in the working direction, the rolls getting in contact with the rear of the transport vehicle as the road construction machine advances slowly. The road construction machine then pushes along the transport vehicle via the collision rolls while the paving process of the road paver is continued. The transport vehicle can then transfer the paving material into the material hopper of the road construction machine, which is located at the front in the working direction, by tilting the loading area to the rear. Once the transfer is completed, the loading area can be lowered, and the transport vehicle drives away in the forward direction.

In order to ensure the complete emptying of the hopper, the hopper typically comprises a discharge flap. The discharge flap accounts for the main part of the hopper base and further comprises flap side walls, which are located at the periphery transversely to the working direction, the flap side walls extending next to the inner side of the hopper side wall and being fastened to the flap base. Thus, the flap side wall vertically protrudes upward from the hopper base substantially parallel to the hopper side wall extending in the working direction. Typically, it is supported to be moveable in relation to the hopper side wall. In order to put paving material located on the discharge flap completely into the conveyor device of the road paver or feeder for further processing, the discharge flap is designed to be pivotable about a pivot axis extending transversely to the working direction. The discharge flap, together with the flap base and flap side walls, can thus be pivoted vertically upward and against the working direction about the pivot axis extending transversely to the working direction. As a result of this movement, paving material located on the discharge flap is dumped into the conveyor device of the road paver or feeder, which is located behind the material hopper in the working direction. In this way, the material hopper can be completely emptied of paving material.

As already indicated above, the flap side wall extends vertically upward from the flap base next to the hopper side wall. The hopper side wall refers to the lateral boundary of the entire hopper space. The side of the hopper side wall located outward transversely to the working direction forms part of the outer contour of the road paver or feeder. In contrast, the flap side wall is located inside the material hopper next to the hopper side wall. It goes without saying that such an arrangement of hopper side wall and flap side wall is present on both sides of the material hopper. In the working mode of the road paver or feeder, the flap side wall and the hopper side wall either directly rest against one another or are spaced from one another by a narrow gap. In practice, paving material will often enter the gap between the flap side wall and the hopper side wall. The entered paving material spreads the flap side wall from the hopper side wall and increases the gap between the two side walls. In this way, the intrusion of additional paving material between the two side walls is facilitated, and the gap between the flap side wall and the hopper side wall is further increased. In this way, paving material may on the one hand fall between the hopper side wall and the flap side wall onto the ground. Moreover, paving material may jam between the hopper side wall and the flap side wall, which leads to a jamming of the flap side wall or the discharge flap per se, whereby its function is limited. Insistently jammed paving material may also result in a deformation of the discharge flap in this region, and thus in a damage.

SUMMARY

The object of the present invention is to solve the described problems. In particular, it is to be ensured that paving material cannot enter between the flap side wall and the hopper side wall, so that damages and restricted functioning of the discharge flap are prevented.

The object is achieved by means of a road paver or a feeder according to the independent claim. Preferred embodiments are described in the dependent claims.

Specifically, in a road construction machine of the road paver or feeder type, the object is achieved in that a protective cover is arranged on the hopper side wall, which at least partially engages around the edge of the flap side wall. In particular, the edge of the flap side wall refers to the edge of the flap side wall directed forward in the working direction and vertically upward. At this place, in particular during the transfer process of paving material from a transport vehicle into the material hopper, there is a particularly high risk for paving material to enter between the flap side wall and the hopper side wall. The protective cover extends from the hopper side wall at least partially vertically over the flap side wall and then, on the side of the flap side wall opposite the hopper side wall, partially vertically downward around the flap side wall. In this way, the protective cover at least partially closes or covers the gap between the hopper side wall and the flap side wall and thus prevents paving material from falling between the two hopper and flap side walls, in particular when coming from the front and from above in the working direction. In other words, the protective cover forms a roof fixed to the hopper side wall, which extends over and around the flap side wall. Of course, the protective cover needs to be configured in such a way that it does not limit the movability of the flap side wall and thus of the discharge flap per se. Thus, the discharge flap is located outside the pivoting curve travelled by the discharge flap and particularly the flap side wall during a tilting of the discharge flap about the pivot axis. Thus, the protective cover according to the invention does not negatively affect the functioning of the discharge flap, while intrusion of paving material into the gap between the flap side wall and the hopper side wall is reliably prevented.

Typically, the flap side wall of a road paver or a feeder comprises a base edge fixed to the flap base, an inner edge and a curve edge. Thus, the base edge is the edge which is located at the side or edge of the flap side wall fixed with the flap base. When the base flap is pivoted downward, the base edge simultaneously is the vertically lower edge of the flap side wall. The inner edge is the edge of the flap side wall which is oriented vertically upward and rearward in the working direction. The edge of the flap side wall located on the inner edge is typically directed away from the transport vehicle during the loading process of the material hopper, so that there is a negligible small risk for paving material to enter between the flap side wall and the hopper side wall. The curve edge is the edge of the flap side wall which is oriented vertically upward and forward in the working direction. The curve edge extends along the pivoting curve defined by the pivoting movement about the pivot axis. In other words, this edge is oriented in the direction of the transport vehicle in the transfer process of the paving material from the transport vehicle into the material hopper. As a result, the risk of paving material getting between the flap side wall and the hopper side wall is the highest on the curve edge. For this reason, it is preferred that the protective cover at least partially engages round the curve edge. The protective cover thus particularly extends beyond and around the curve edge of the flap side wall. It is preferred when the protective cover covers the curve edge, for example, by at least 70%, preferably at least 80%, more preferably at least 90%, and most preferably completely, in particular on the upper edge of the flap side wall. The greater the part of the curve edge covered by the protective cover, the better the protective cover according to the invention can fulfill its function and prevent paving material from getting between the hopper side wall and the flap side wall.

Thus, a basic idea of the invention is that the gap between the hopper side wall and the flap side wall, in particular upward in the vertical direction, is covered or protected or closed by the protective cover. It has proven advantageous that the flap side wall is at least partially engaged by the protective cover, in addition to closing the gap in the vertical direction, in such a way that the protective cover retains the flap side wall on the hopper side wall. In a preferred embodiment, the protective cover thus includes a bridging part arranged on the hopper side wall, and an overlapping part arranged on the bridging part, which together with the hopper side wall form a guiding space, in which the edge of the flap side wall, in particular the curve edge, is arranged. The bridging part refers in particular to the part of the protective cover which is arranged vertically above the flap side wall or the curve edge of the flap side wall or protrudes from the hopper side wall into the hopper space. The overlapping part refers to the part of the protective cover by means of which the protective cover engages around the flap side wall. The overlapping part is thus the part of the protective cover that is located on the side of the flap side wall opposite the hopper side wall. Thus, the protective cover encloses a guiding space together with the hopper side wall, in which the flap side wall is located with its edge, in particular its curve edge. In this embodiment, the protective cover is particularly configured in the form of a guidance rail, which prevents that the curve edge of the flap side wall detaches from the hopper side wall. The flap side wall is held on the hopper side wall as the overlapping part of the protective cover engages round the curve edge of the flap side wall. Accordingly, the protective cover ensures a constant maximum gap distance between the flap side wall and the hopper side wall and thus not only prevents paving material from entering between the flap side wall and the hopper side wall, but it also prevents the gap between the two side walls from widening. When the discharge flap is tilted about the pivot axis, the flap side wall, in particular the curve edge thereof, is guided within the guiding space of the protective cover. Widening of the gap between the two side walls is thus efficiently prevented even during the pivoting process.

It is preferred for the guiding space to be designed to be closed in the working direction and vertically upward, in particularly by means of the bridging part. A complete closure of the guiding space in the working direction and vertically upward ensures that the intrusion of paving material between the hopper side wall and the flap side wall is effectively prevented in this place.

Generally, the biggest risk for paving material to get between the flap side wall and the hopper side wall lies with the paving material transfer process from a transport vehicle into the material hopper of the road paver or the feeder. During the transfer process, the discharge flap is typically pivoted downward in its essentially horizontal position. Appropriately, the protective cover engages around the edge of the flap side wall in particular in the horizontal position of the discharge flap. However, in the case that the material hopper of the road paver or the feeder is filled to a significant extent, paving material may enter between the side walls even in other positions of the discharge flap. Thus, it is preferred that the protective cover has a profile, in particular curved, which is adapted to the movement of the flap side wall when the discharge flap is tilted about the pivot axis, in particular in such a way that the engagement of the protective cover around the edge of the flap side wall is maintained during the entire tilting process. In other words, the guiding space of the protective cover is formed across the entire course of the pivoting curve of the curve edge of the flap side wall. In particular, the guiding space is configured to be closed in the working direction and vertically upward over its entire length along the pivoting curve of the curve edge. Thus, the curve edge of the flap side wall is engaged around by the protective cover, in particular essentially completely, in each of the positions of the flap side wall enabled by the pivoting of the discharge flap about the pivot axis. This configuration does not only reliably prevent paving material from entering between the side walls across the entire tilting movement, but a precise guidance of the flap side wall along the hopper side wall is ensured at a constant clearance across the entire tilting movement at the same time. This also efficiently prevents a widening of the gap between the flap side wall and the hopper side wall.

The different parts of the protective cover can be formed as separate components, which will then be fastened to the road paver or the feeder. This may be of advantage since a comparatively inexpensive manufacture is possible then. However, the protective cover according to the present invention will be especially stable if at least the bridging part is formed integrally with the hopper side wall. In this case, the hopper side wall is already completely produced together with the bridging part, so that merely the overlapping part as a further component has to be fastened to the hopper side wall or the bridging part. As an alternative, it is also possible for the bridging part to be formed integrally with the overlapping part. In this case, the bridging part and the overlapping part together form one single component, which can be fixed to the hopper side wall. In another alternative, it is also possible that the bridging part and the overlapping part are together formed integrally with the hopper side wall. In this case, which ensures highest possible stability of the protective cover, the hopper side wall is thus completely produced together with the protective cover or the bridging part and overlapping part thereof. No other component needs to be fastened on the road paver or the feeder for providing the protective cover.

Basically, any material that has a sufficient stability can be selected for the protective cover, in order to withstand the working conditions in the material hopper of the road paver or the feeder. For example, the protective cover could be made of metal, in particular steel, or plastic. It is also possible to produce the protective cover from different materials; it would be possible, for example, to form the bridging part of metal, in particular steel, and to fasten an overlapping part made of plastic on this bridging part. However, it is preferred to form the bridging part and the overlapping part at least from the same material or consisting of the same material.

Depending on the material that the individual components of the protective cover are made of, there are different fastening options for the protective cover on the material hopper or the hopper side wall. Metal parts, in particular steel parts, may be welded to the material hopper, for example, while plastic parts are fastened by means of fastening means. In one exemplary embodiment, the bridging part is welded to the hopper side wall and the overlapping part is welded to the bridging part. According to an alternative embodiment, the bridging part is welded to the hopper side wall and the overlapping part is detachably fastened to the bridging part by means of at least one releasable fastening means. The releasable fastening means may be a fastening screw, for example, which is inserted through the bridging part and screwed in a threaded hole on the hopper side wall. As an alternative, the releasable fastening means could also be a threaded bolt welded to the hopper side wall, which is inserted through the bridging part and on which a nut can be screwed for fastening the bringing part. In another alternative embodiment, the bridging part is detachably fastened to the hopper side wall by means of at least one releasable fastening means and the overlapping part is detachably fastened to the bridging part by means of at least one further fastening means. In this embodiment, the bridging part and the overlapping part can thus be released from one another separately in each case by releasing the fastening means from the hopper side wall or from one another. Another alternative embodiment provides that the bridging part and the overlapping part are detachably fastened together on the hopper side wall by means of at least one releasable fastening means. In this case, the bridging part and the overlapping part are thus fastened to one another and to the hopper side wall via the same fastening means, so that they can be mounted and demounted together and in a simple and fast manner. All of the above-mentioned exemplary embodiments are also suitable for retrofitting an existing road paver or feeder with a protective cover according to the invention.

In order to ensure a trouble-free tilting movement of the discharge flap, a pivot recess may be formed in the flap base directly next to the flap side wall at the front end of the flap base in the working direction, in which part of the protective cover is received when the discharge flap is tilted. In other words, the protective cover is partially guided through the pivot recess in the flap base when pivoting or tilting the discharge flap about the pivot axis. The pivot recess in the flap base is preferably used when the flap side wall in the horizontal position of the discharge flap essentially extends as far in the working direction as the flap base. In this case, the pivot recess prevents a collision of the part of the protective flap engaging around the flap side wall with the flap base. By providing the pivot recess, tilting the discharge flap can be effected without any problems.

According to an alternative embodiment, the flap side wall projects beyond the flap base in the working direction and the protective cover engages only around the part of the flap side wall projecting beyond the flap base. Projecting in the working direction particularly relates to the horizontal position of the discharge flap. The flap side wall thus projects beyond the flap base in such a way that the edge of the flap side wall can be engaged around by the protective cover, without the flap base colliding with the protective cover in a pivoting movement of the discharge flap about the pivot axis. In this case, the discharge flap can be freely tilted about the pivot axis without having to provide a pivot recess in the flap base.

BRIEF DESCRIPTION OF THE DRAWINGS

Hereinafter, the invention will be described in greater detail by means of the exemplary embodiments shown in the figures. In the schematic figures.

DETAILED DESCRIPTION

Figure 1:
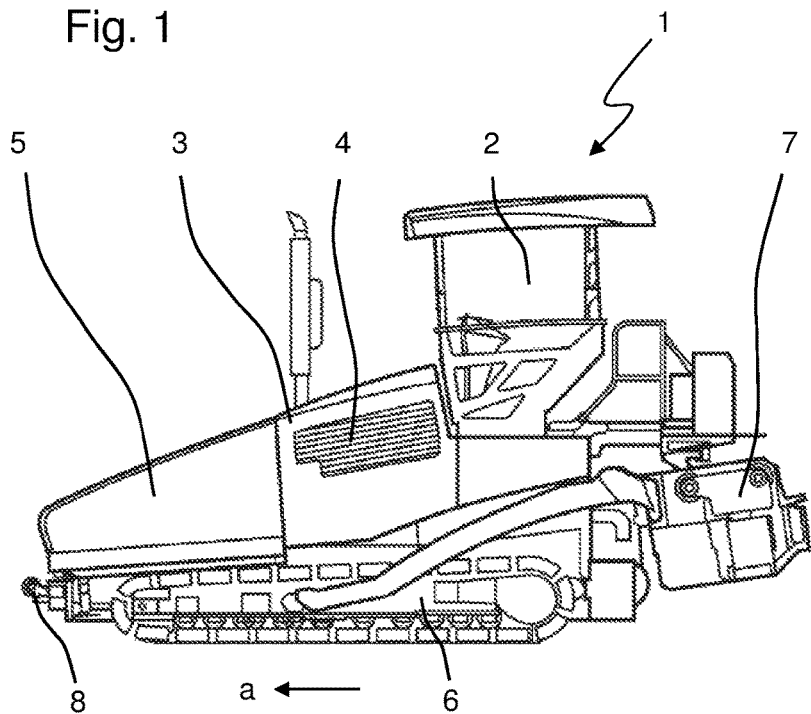
FIG. 1 is a side view of a road paver.

Like or equivalent components are indicated by like reference numerals. Recurring components may not be separately indicated in each figure.

Figure 2:
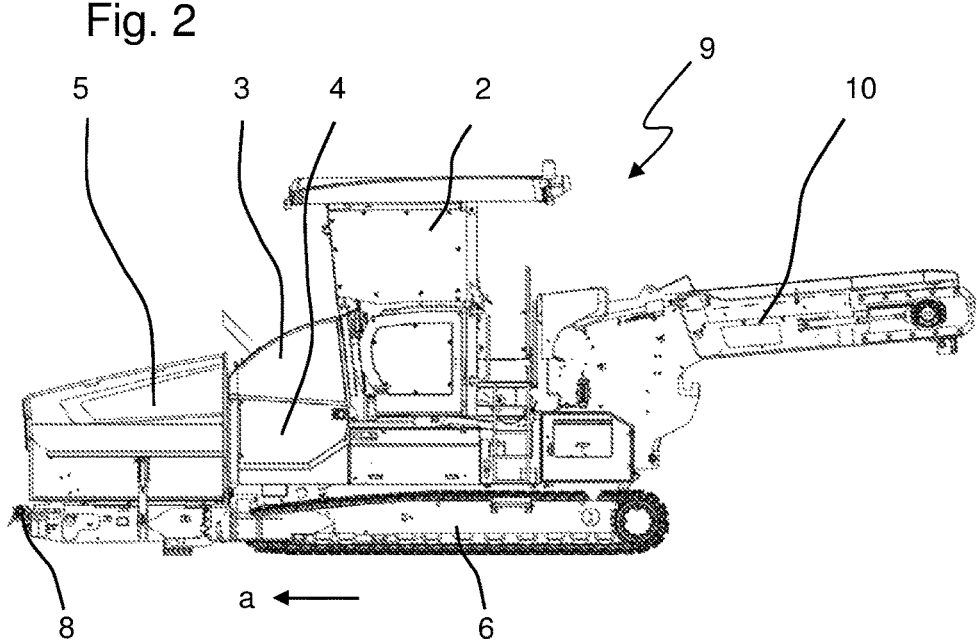
FIG. 2 is a side view of a feeder.

FIGS. 1 and 2 show generic road construction machines, namely a road paver 1 (FIG. 1) and a feeder 9 (FIG. 2). The road construction machines 1, 9 include an operator platform 2 and a machine frame 3. Furthermore, they comprise a chassis 6 driven by a drive unit 4, which in most cases comprises a diesel combustion engine, by means of which the road construction machines 1, 9 can move forward in the working direction a in the working mode. The road paver 1 comprises a screed 7 at its rear, by means of which it can distribute, smoothen and compact a paving material transversally to the working direction a. In contrast, the feeder 9 does not include a screed 7, but a feeding conveyor 10, by means of which it can transfer paving material onto the road paver 1. Both the road paver 1 and the feeder 9 have a material hopper 5 for paving material. The feeder 9 can transfer, i.e., load, paving material from its material hopper 5 via the feeding conveyor 10 into the material hopper 5 of the road paver 1. Furthermore, both the road paver 1 and the feeder 9 can be supplied with paving material by a transport vehicle (not shown), for example a truck. For this kind of loading, the road construction machines 1, 9 comprise collision rollers 8 in the working direction a at the front. Using these collision rollers 8, they push along a transport vehicle in front of them during the loading process, while paving material is being transferred from the transport vehicle into the material hopper 5. While laying a base layer by means of a road paver 1, a plurality of loads of paving material must normally be transferred from transport vehicles onto the road paver 1 and/or the feeder 9.

Figure 3:
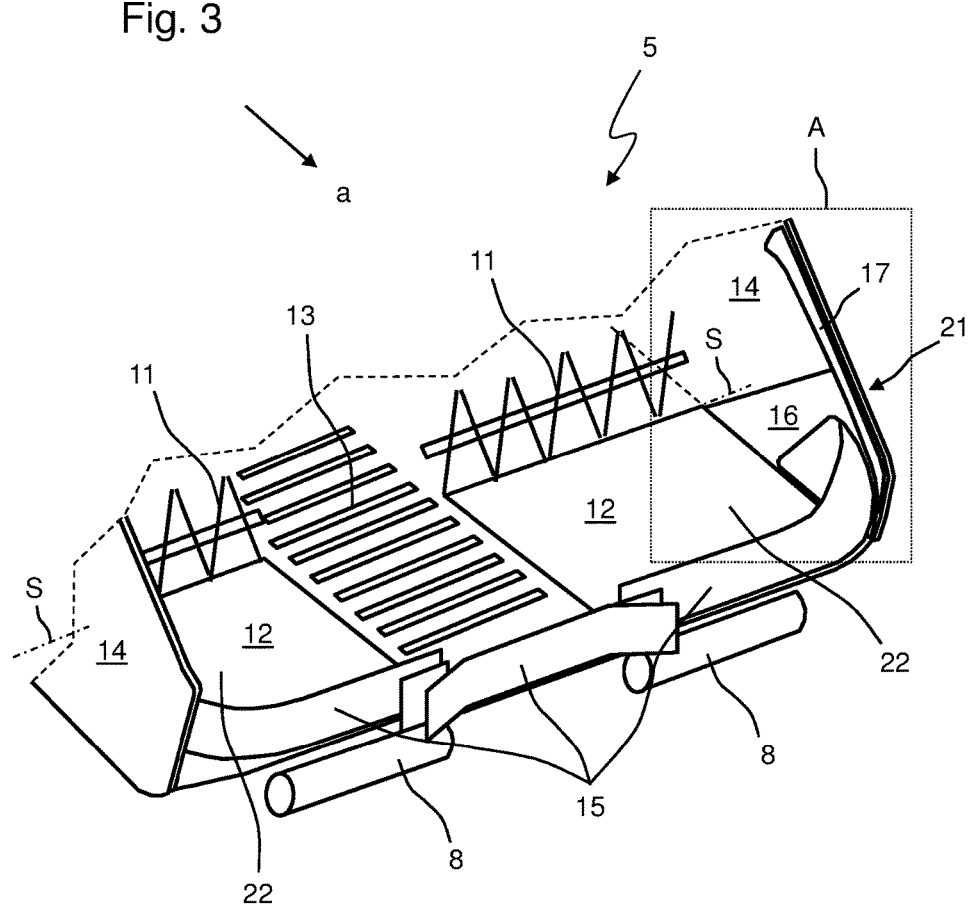
FIG. 3 is a perspective view of a material hopper from obliquely in front and vertically above.

FIG. 3 shows a perspective, oblique top view from the front onto the material hopper 5 of the road construction machines 1, 9 in the working direction a. The material hopper 5 comprises a hopper base (below the flap base 12) and side walls 14 vertically protruding on both sides transversely to the working direction. During working operation, the side walls 14 of the material hopper 5 can be pivoted/displaced, in order to enable a loading of the hopper and/or to influence the size of the loading area. A conveying screw 11 is located on the rear side of the material hopper 5, viewed in the working direction a, the screw transferring paving material from the material hopper 5 onto a scraper belt 13, from which the paving material is transported against the working direction a through the road construction machine 1, 9 and transferred either to a screed 7 or to a feeding conveyor 10. A stop element 15, mostly a rubber element, is located on the side of the material hopper 5 located in the working direction a, which prevents paving material from falling out in the working direction a. Furthermore, the material hopper 5 includes a discharge flap 22, which includes a flap base 12 and a flap side wall 16. In the exemplary embodiment shown, the material hopper 5 comprises two such discharge flaps 22, which are arranged on both sides of the material hopper 5 opposite one another transversely to the working direction a in a mirror-symmetrical fashion. The discharge flaps 22 are used to supply paving material to the conveying screws 11, in that the discharge flaps 22 can be tilted or pivoted about a pivot axis S extending transversely to the working direction a. In this way, paving material located on top of the discharge flap 22 is poured into the conveying screws 11.

Figure 4:
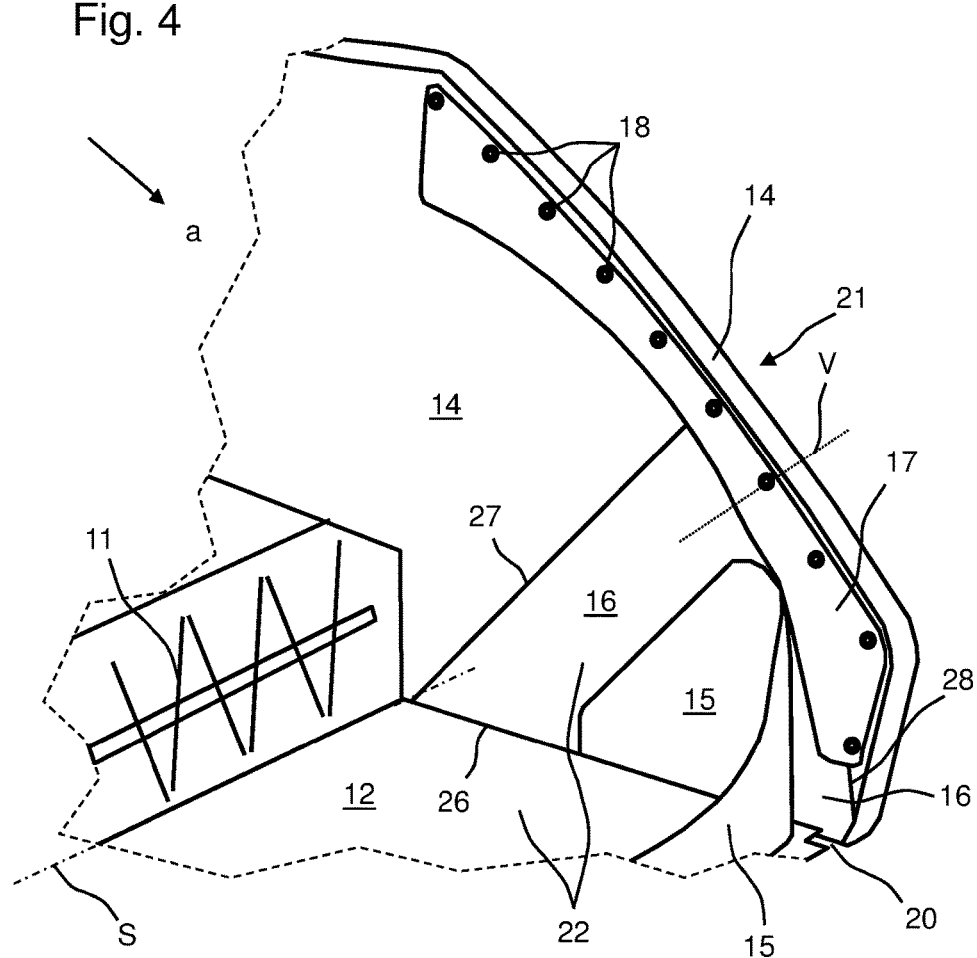
FIG. 4 is a detailed view according to detail section A of FIG. 3.

FIG. 4 shows an enlarged view according to detail section A of FIG. 3. The flap side wall 16 is shown in FIG. 4 with its respective edges. In particular, the flap side wall 16 comprises a base edge 26, at which the flap side wall 16 is connected to the flap base 12, an inner edge 27 oriented vertically upward and to the rear, viewed in the working direction a, and a curve edge 28 oriented vertically upward and pointing to the front, viewed in the working direction a. The curve edge 28 of the flap side wall 16 extends along the pivot curve which is defined by the pivot movement of the discharge flap 22 about the pivot axis S. Furthermore, FIG. 4 shows the protective cover 21 arranged on the hopper side wall 14. As illustrated in FIG. 4, the flap side wall 16 is essentially completely engaged around by the protective cover 21 on its curve edge 28. The protective cover 21 essentially completely covers the curve edge 28 of the flap side wall 16 in the working direction a and vertically upward, so that no paving material can enter between the flap side wall 16 and the hopper side wall 14. At the same time, the protective cover 21 forms a guide 17 for the flap side wall 16, which guides the flap side wall 16 in its movement along the pivot curve when being tilted or pivoted about the pivot axis S. In this way, the flap side wall 16 is held close to the hopper side wall 14 and a widening or spreading of the flap side wall 16 away from the hopper side wall 14 is prevented. In order to perform this pivoting movement without problems, a pivot recess 20 is provided on the flap base 12. The pivot recess 20 accommodates the protective cover 21 when the discharge flap 22 is tilted about the pivot axis S. In this way, movement freedom of the discharge flap 22 is not limited by the protective cover 21. The protective cover 21 is fastened to the hopper side wall 14 by fastening means 18 across the entire course along the pivoting curve.

Figure 5:
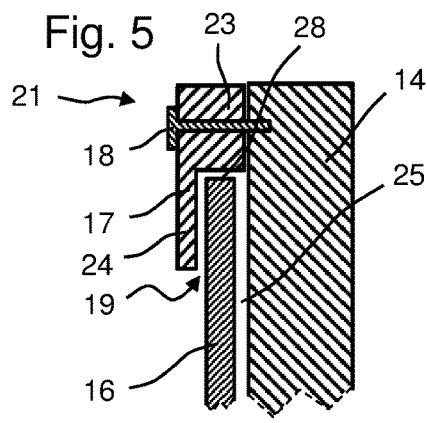
FIG. 5 is a sectional view of a first embodiment along line V of FIG. 4.
Figure 6:
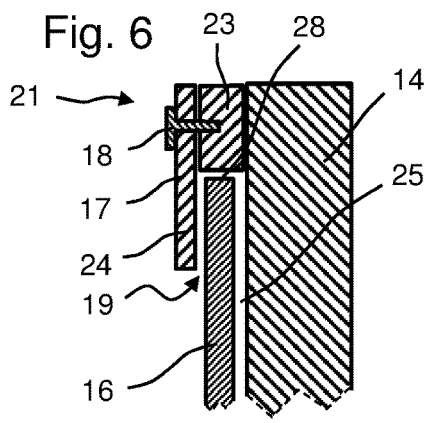
FIG. 6 is a sectional view of a second embodiment along line V of FIG. 4.

FIGS. 5 and 6 each show different exemplary embodiments of the protective cover 21 and the fastening thereof on the hopper side wall 14. FIGS. 5 and 6 are sectional views along the line V according to FIG. 4. As can be seen from the figures, the protective cover 21 comprises a bridging part 23 and an overlapping part 24. The bridging part 23 is that part of the protective cover 21 that extends from the hopper side wall 14 transversely to the working direction a towards the center of the machine and in particular bridges over the gap 25. The overlapping part 24 is that part of the protective cover 21 that extends vertically downwards on the side of the flap side wall 16 opposite the hopper side wall 14. The bridging part connects the overlapping part 24 with the hopper side wall 14. In the embodiment according to FIG. 5, the bridging part 23 and the overlapping part 24 are formed integrally. In the embodiment according to FIG. 6, in contrast, the bridging part 23 and the overlapping part 24 are two separate components. The protective cover 21, i.e., its bridging part 23 and overlapping part 24, form a guiding space 19 together with the hopper side wall 14, in which the curve edge 28 of the flap side wall 16 is received. As can be taken from the figures, the guiding space 19 and in particular the gap 25 between the flap side wall 16 and the hopper side wall 14 are formed to be closed upwards. The guiding space 19 extends in the protective cover 21 along the pivot curve of the curve edge 28 of the flap side wall 16. This way, it is reliably prevented that paving material can enter the gap 25 from vertically above between the flap side wall and the hopper side wall 14, namely in every pivoting position of the discharge flap 22. At the same time, the overlapping part 24 forms a guidance 17, said guidance preventing the flap side wall 16 from moving away from the hopper side wall 14 due to a widening of the gap 25. Altogether, a movement transversely to the working direction a of the flap side wall 16 is limited by the hopper side wall 14 on the one hand, and by the guide 17, i.e., the overlapping part 24 of the protective cover 21, on the other hand. This way, the protective cover 21 contributes to a constant gap size of the gap 25 between the flap side wall 16 and the hopper side wall 14. Altogether, this prevents a jamming of the flap side wall 16 and therefore a loss of function of or a damage to the discharge flap 22.

The fastening of the protective cover 21 according to the embodiments of FIGS. 5 and 6 is configured differently. For example, the integrally-formed protective cover 21 according to FIG. 5 is fixed to the hopper side wall 14 by means of multiple fastening means 18 distributed along its longitudinal axis, for example threaded bolts with nuts or screws. This way, the protective cover 21 can easily be demounted from or mounted to the hopper side wall 14. A replacement of a damaged protective cover 21 is also possible without problems. In the embodiment according to FIG. 6, the protective cover 21 is formed in two parts, i.e., with the bridging part 23 and the overlapping part 24 formed separately from one another. In the exemplary embodiment shown, the bridging part 23 is welded to the hopper side wall 14 and therefore connected thereto in a permanent manner. The overlapping part, in contrast, is fixed to the bridging part 23 by means of a releasable fastening means 18, for example a screw or a threaded bolt having a nut. In this embodiment, only the overlapping part 24 is thus formed to be releasable or demountable and can be replaced separately from the bridging part 23 without the bridging part. Both embodiments of FIGS. 5 and 6 of the protective cover according to the invention are suitable for trouble-free retrofitting on existing road pavers 1 or feeders 9.

What is claimed is:

1. A road paver or feeder, comprising:
   a chassis driven by a drive unit; and
   a material hopper located at a front of the road paver or the feeder in a working direction of the road paver or the feeder, the hopper comprising a hopper side wall extending in the working direction and a discharge flap tiltable about a pivot axis extending transversely to the working direction, the discharge flap comprising
      a flap base, and
      a flap side wall which extends next to the hopper side wall and is fixed to the flap base and supported to be moveable relative to the hopper side wall, and
      wherein a protective cover is arranged on the hopper side wall, which at least partially engages around an edge of the flap side wall.

2. The road paver or feeder according to claim 1, wherein the edge of the flap side wall includes a base edge fixed to the flap base, an inner edge and a curve edge, and wherein the protective cover at least partially engages around the curve edge.

3. The road paver or feeder according to claim 1, wherein the protective cover comprises a bridging part arranged on the hopper side wall and an overlapping part arranged on the bridging part, which together with the hopper side wall form a guiding space in which the flap side wall is arranged.

4. The road paver or feeder according to claim 3, wherein the guiding space is formed to be closed in the working direction and vertically upward.

5. The road paver or feeder according to claim 1, wherein the protective cover includes a profile which is curved and is adapted to a movement of the flap side wall when the discharge flap is tilted about the pivot axis.

6. The road paver or feeder according to claim 3, wherein the protective cover comprises at least one of the following features:
   the bridging part is formed integrally with the hopper side wall;
   the bridging part is formed integrally with the overlapping part; and
   the bridging part and the overlapping part together are formed integrally with the hopper side wall.

7. The road paver or feeder according to claim 3, wherein the bridging part and the overlapping part are formed of a same material.

8. The road paver or feeder according to claim 3, wherein the protective cover comprises at least one of the following features:
   the bridging part is welded to the hopper side wall, and the overlapping part is welded to the bridging part;
   the bridging part is welded to the hopper side wall, and the overlapping part is detachably mounted on the bridging part by at least one releasable fastening means;
   the bridging part is detachably mounted on the hopper side wall by at least one releasable fastening means, and the overlapping part is detachably mounted on the bridging part by at least one further releasable fastening means; and
   the bridging part and the overlapping part together are detachably mounted on the hopper side wall by at least one releasable fastening means.

9. The road paver or feeder according to claim 1, wherein a pivot recess is formed in the flap base at a front end of the flap base in the working direction directly next to the flap side wall, in which pivot recess a part of the protective cover is received when the discharge flap is tilted.

10. The road paver or feeder according to claim 1, wherein the flap side wall projects beyond the flap base in the working direction, and the protective cover engages only over a part of the flap side wall protruding beyond the flap base.

11. The road paver or feeder according to claim 3, wherein the edge of the flap side wall is arranged in the guiding space.

12. The road paver or feeder according to claim 11, wherein the edge of the flap side wall is a curve edge.

13. The road paver or feeder according to claim 4, wherein the guiding space is formed to be closed in the working direction and vertically upward by the bridging part.

14. The road paver or feeder according to claim 5, wherein the protective cover is adapted to the movement of the flap side wall when the discharge flap is tilted about the pivot axis such that an engagement of the protective cover around the edge of the flap side wall is maintained over the entire tilting range.

* * * * *